United States Patent [19]

Slack

[11] Patent Number: 4,898,971
[45] Date of Patent: Feb. 6, 1990

[54] LIQUID ISOCYANATE PREPOLYMERS

[75] Inventor: William E. Slack, Moundsville, W. Va.

[73] Assignee: Mobay Corporation, Pittsburgh, Pa.

[21] Appl. No.: 300,868

[22] Filed: Jan. 23, 1989

[51] Int. Cl.$^4$ .................... C07C 118/00; C08G 18/00
[52] U.S. Cl. ..................... 560/359; 521/159
[58] Field of Search .......................... 560/359

[56] References Cited

U.S. PATENT DOCUMENTS

| | | | |
|---|---|---|---|
| 3,808,250 | 4/1974 | Blahak et al. | 260/455 |
| 3,817,940 | 6/1974 | Blahak et al. | 260/77.5 |
| 3,929,863 | 12/1975 | Blahak et al. | 260/471 |
| 3,975,428 | 8/1976 | Blahak et al. | 260/472 |
| 4,016,143 | 4/1977 | Blahak et al. | 260/77.5 |
| 4,136,091 | 1/1979 | Mazanek et al. | 260/455 |
| 4,169,206 | 9/1979 | Mazanek et al. | 560/50 |
| 4,180,644 | 12/1979 | Marquis et al. | 528/68 |
| 4,186,257 | 1/1980 | Blahak et al. | 521/159 |
| 4,228,249 | 10/1980 | Blahak et al. | 521/159 |
| 4,260,557 | 4/1981 | Mazanek et al. | 260/455 |
| 4,328,322 | 5/1982 | Baron | 521/163 |
| 4,504,648 | 3/1985 | Otani et al. | 528/76 |
| 4,515,981 | 5/1985 | Otani et al. | 560/50 |
| 4,609,683 | 9/1986 | Grigsby, Jr. et al. | 521/159 |
| 4,609,684 | 9/1986 | Grigsby, Jr. et al. | 521/163 |
| 4,611,083 | 9/1986 | Buethe et al. | 560/351 |
| 4,686,242 | 8/1987 | Turner et al. | 521/137 |
| 4,689,356 | 8/1987 | Peffley et al. | 521/159 |
| 4,703,100 | 10/1987 | Rasshofer et al. | 528/66 |
| 4,705,814 | 11/1987 | Grigsby, Jr. et al. | 521/159 |
| 4,732,959 | 3/1988 | Otani et al. | 528/68 |
| 4,761,498 | 8/1988 | Knofel et al. | 560/359 |

FOREIGN PATENT DOCUMENTS 268849 6/1988 European Pat. Off. .

Primary Examiner—Alan Siegel
Attorney, Agent, or Firm—Joseph C. Gil

[57] ABSTRACT

The present invention is directed to a liquid, storage-stable isocyanate prepolymer having an isocyanate group content of from 3 to 30% by weight, prepared by reacting
(i) a methyl substituted diisocyanato diphenylmethane with
(ii) a polyamine of the structure

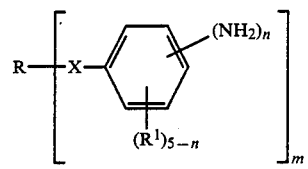

where R represents an m-valent residue obtained by the removal of m-functional groups from a compound having m-functional groups and having a molecular weight of from 76 to about 10,000,
X represents —O—,

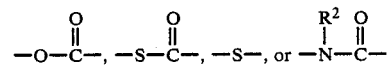

$R^1$ represents hydrogen or an inert substituent,
$R^2$ represents hydrogen, a $C_1$ to $C_5$ alkyl group or a phenyl group,
n is 1 or 2, and
m is an integer of from 2 to 8.

3 Claims, No Drawings

LIQUID ISOCYANATE PREPOLYMERS

BACKGROUND OF THE INVENTION

Urea-group containing polyisocyanate mixtures which are liquid at room temperature are known. See U.S. Pat. Nos. 4,611,083 and 4,703,100. Such mixtures are described as being prepared by reacting polyoxyalkylene polyamines having functionalities of from 2 to 5 and amine numbers of from 20 to 250 with specific polyisocyanates based on diphenylmethane diisocyanate. The polyisocyanates used are selected from the group consisting of (i) at least one diphenylmethane diisocyanate isomer and (ii) a mixture of diphenylmethane diisocyanates and polyphenyl polymethylene polyisocyanates where the diisocyanate content of the mixture is from 55 to 90 weight percent. See also U.S. Pat. No. 4,689,356. Similar products are described in U.S. Pat. No. 4,705,814, but the isocyanate used is an aliphatic isocyanate.

It is also known that diphenylmethane diisocyanate and its higher derivatives can form stable prepolymers with primary amine terminated materials having a degree of amination of from about 25 to 85% and with secondary amine-terminated materials having a degree of amination of from 25 to 100%. See, U.S. Pat. No. 4,686,242. The amines described in this reference are prepared by reacting a hydroxyl-terminated polyether with hydrogen and ammonia or a primary amine in the presence of catalysts to reductively aminate the polyether.

Isocyanate prepolymers are also known which can be prepared by reacting aromatic isocyanates with aromatic amine-amides. See, U.S. Pat. No. 4,609,683. The amides are described as being prepared by reacting isatoic anhydride with a polyoxyalkylene polyamine. Similar amides are described in U.S. Pat. Nos. 4,180,644 and 4,609,684, for use in making a variety of polyurethane type materials.

Compounds having terminal aromatic amine groups and having the general structure:

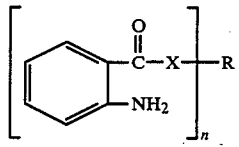

are known. In U.S. Pat. No. 3,808,250, X is defined as oxygen or sulfur, n is an integer of from 2 to 8, and R is defined as an n-valent radical obtained by the removal of hydroxy groups or mercapto groups from an n-valent polyether or polythioether having a molecular weight of from 600 to 10,000. U.S. Pat. Nos. 3,817,940 and 3,929,863 describe similar compounds where R is based on a polyol or polythiol having a molecular weight of less than 600. U.S. Pat. Nos. 3,975,428 and 4,016,143 describe similar compounds prepared by reacting isatoic acid anhydride with a compound containing at least two hydroxyl groups and at least one tertiary nitrogen group and having a molecular weight of from about 119 to about 1000. Similar compounds are described in U.S. Pat. Nos. 4,136,091, 4,169,206, 4,186,257, 4,228,249 and 4,260,557. Para substituted compounds are described in U.S. Pat. Nos. 4,504,648 and 4,515,981. Finally, similar para-, meta- and di-meta substituted compounds are described in U.S. Nos. 4,328,322 and 4,732,959. While all of these references describe that the compounds disclosed can be used to manufacture polyurethane products, none describe liquid isocyanate-terminated prepolymers.

Recently, there have been disclosed poly(amino aromatic) compounds of the structure

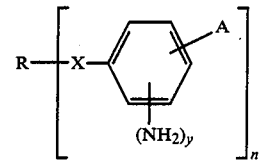

where R is an n-valent group obtained by the removal of the hydroxyl or mercapto groups from n-valent polyol or polythio having a molecular weight of from 400 to about 12,000, A is hydrogen or an inert substituent, X represents oxygen or sulfur, n represents an integer of from 2 to 8, and y is 1 or 2. See European Patent Application 0,268,849 and U.S. application Ser. No. 183,556, filed Apr. 19, 1988. Such compounds are described as useful in preparing polyurethane elastomers.

DESCRIPTION OF THE INVENTION

The present invention is broadly directed to a liquid, storage stable, isocyanate-terminated prepolymer having an isocyanate group content of from 3 to 30 percent by weight and preferably from 14 to 25 percent by weight, prepared by reacting (i) a diisocyanate corresponding to the formula

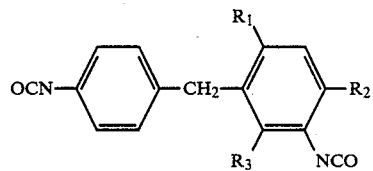

which may be present in admixture with 0 to 40% by weight, based on the total mixture, of diisocyanates corresponding to the formula

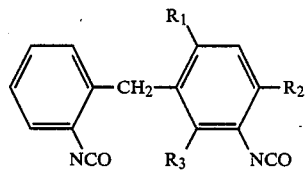

and optionally with 0 to 30% by weight, based on the total mixture, of other diisocyanatodiphenylmethane isomers which maybe substituted; wherein two of the radicals $R_1$, $R_2$ and $R_3$ represent hydrogen and one of the radicals $R_1$, $R_2$ and $R_3$ represents a methyl group; with (ii) a polyamine of the structure:

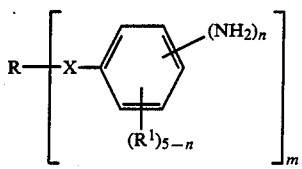

where R represents an m-valent residue obtained by the removal of m functional groups, such as hydroxy or mercapto groups, from a compound having m functional groups and having a molecular weight of from 76 to about 10,000.

X represents —O—,

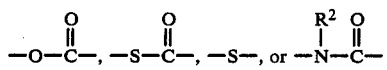

each $R^1$, which can be the same or different, represents hydrogen or an inert substituent, such as a $C_1$ to $C_3$ alkyl group, $R^2$ represents hydrogen, a $C_1$ to $C_6$ alkyl group or a phenyl group, n is 1 or 2, and m is an integer of from 2 to 8.

By "inert substituent" is meant any substituent that does not react with an amine, nitro, hydroxyl or isocyanate group, and includes lower alkyl of from 1 to 8 carbon atoms, such as methyl, ethyl, propyl, butyl and the like; $C_8$ to $C_{12}$ aryl groups; $C_7$ to $C_{10}$ aralkyl groups; $C_4$ to $C_6$ cycloalkyl groups; and $C_1$ to $C_8$ alkoxy groups.

The isocyanates useful to prepare the prepolymers of the present invention are known and are described in U.S. Pat. No. 4,761,498, the disclosure of which is herein incorporated by reference.

The isocyanates are reacted with polyamines of the structure

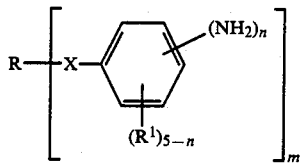

where R, $R^1$, X, m and n are as defined above. The production of such polyamines is generally known and is described in U.S. Pat. Nos. 3,808,250, 3,817,940, 3,929,863, 3,975,428, 4,016,143, 4,136,091, 4,169,206, 4,260,557, 4,186,257, 4,228,249, 4,504,648, 4,515,981, 4,732,959 and 4,328,322, the disclosures of which are all herein incorporated by reference.

Urea group-containing prepolymers are generally prepared by adding the amine, which is at a temperature of from 25° to 60° C. (and preferably at room temperature), to the isocyanate, which is typically at a temperature of from 25° to 60° C. The mixture is stirred and held at from 40° to 60° C. for a period of from 5 minutes to 1 hour. The product is then cooled to room temperature. Biuret group-containing prepolymers can be prepared by holding the reaction mixtures at temperatures of from 90° to 130° C. for from 15 minutes to two hours, and then quench cooling the product to room temperature. In preparing the biuret prepolymer, it is preferred to heat the mixture to the 90° to 130° C. range as rapidly as possible.

One particularly preferred group of polyamines are those of the structure:

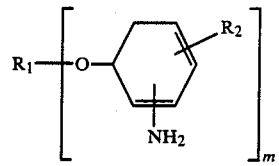

wherein $R_1$ denotes an m-valent residue obtained by the removal of m-hydroxyl groups from a polyhydroxyl compound having m-hydroxyl groups and having a molecular weight of 76 to about 10,000, preferably from 76 to about 6,000, $R_2$ denotes a methyl group or preferably hydrogen and m denotes an integer with a value of from 2 to 8, preferably from 2 to 4 and most preferably 2 or 3.

Such compounds are prepared by first reacting an m-valent polyhydroxyl compound with a nitro halogen benzene to form the corresponding nitrophenoxy adduct, and thereafter hydrogenating the adduct to form the corresponding amino phenoxy product. Further details as to the production of the preferred amines can be found in European Patent Application 0,268,849, and in U.S. patent application Ser. No. 183,556, filed Apr. 19, 1988, the disclosures of which are herein incorporated by reference.

The invention is further illustrated but is not intended to be limited by the following examples in which all parts and percentages are by weight unless otherwise specified.

In the examples which follow, the following were used:

POLYOL-A: a propylene glycol/propylene oxide adduct having 10% by weight ethylene oxide termination and having an OH number of about 56.

POLYOL-B: a glycerine/propylene oxide adduct having 10% by weight ethylene oxide termination and having an OH number of about 56.

POLYOL-C: a glycerine/propylene oxide adduct having 10% by weight ethylene oxide termination and having an OH number of about 38.

POLYOL-D: a propylene glycol/propylene oxide adduct having 10% by weight ethylene oxide termination and having an OH number of about 38.

POLYOL-E: a propylene glycol/propylene oxide adduct having 10% by weight ethylene oxide termination and having an OH number of about 112.

POLYOL-F: a glycerine/propylene oxide adduct having 10% by weight ethylene oxide termination and having an OH number of about 112.

POLYOL-G: a propylene glycol/propylene oxide adduct having an OH number of about 112.

POLYOL-H: a propylene glycol/propylene oxide adduct having an OH number of about 374.

POLYOL-I: a polytetrahydrofuran ether diol having an OH number of about 56.

POLYAMINE-A: To a stirred solution of 4429 grams (1.0 mole) of POLYOL-C and 709 grams (4.5 moles) of orthochloronitrobenzene were added 180 grams (4.5 moles) of granular sodium hydroxide. The temperature of the reaction mixture was maintained at 65° C. during the addition of the sodium hydroxide (which took about 30 minutes). The reaction mixture was then stirred at 65° C. for an additional 40 hours. To the stirred reaction mixture was then added 300 grams of distilled water and enough concentrated hydrochloric acid to make the mixture acidic. The resultant acidic mixture was heated to 120° C. at 1 mm Hg pressure to remove excess orthochloronitrobenzene and water. The product was then filtered to afford a dark red, clear liquid. 932 grams of the filtered product were charged to a one gallon, high pressure hydrogenation reactor, followed by the addition of 930 ml of methanol and 30 grams of Raney nickel. The reaction mixture was stirred under a 1000 psi hydrogen gas pressure while being heated over a 30 minute period to 130° C. After one hour at 130° C., hydrogen gas uptake had become very slow. After an additional 4 hours at 130° C., the reaction mixture was cooled and the Raney nickel was removed by filtration. The methanol and any low boiling materials present were removed by vacuum distillation. The resultant dark liquid had a viscosity at 25° C. of 1530 mPa.s and an amine number of about 36, which correspond to 100% conversion to the triamine.

POLYAMINE-B: To a stirred solution of 2953 grams (1.0 mole) of POLYOL-D and 473 grams (3.0 moles) of orthochloronitrobenzene were added 120 grams (3.0) moles) of granular sodium hydroxide. The temperature of the reaction mixture was maintained at 65° C. during the addition of the sodium hydroxide (which required about 30 minutes). The reaction mixture was then stirred for an additional 32 hours and worked-up as described for POLYAMINE-A. Reduction of the material as described for POLYAMINE-A produced a dark liquid having a viscosity of 1040 mPa.s at 25° C. and an amine number of about 33, which corresponded to 92% conversion to the diamine.

POLYAMINE-C: To a stirred solution of 3000 grams (1.0 mole) of POLYOL-B and 591 grams (3.75 moles) of orthochloronitrobenzene were added 180 grams (4.5) moles) of granular sodium hydroxide. The temperature of the reaction mixture was maintainedc at 65° C. during the addition of the sodium hydroxide (which required about 30 minutes). The reaction mixture was then stirred for an additional 16 hours and worked-up as described for POLYAMINE-A. Reduction of the material as described for POLYAMINE-A produced a dark liquid having a viscosity of 1190 mPa.s at 25° C. and an amine number of about 50, which corresponded to 98% conversion to the triamine.

POLYAMINE-D: To a stirred solution of 2000 grams (1.0 mole) of POLYOL-A and 394 grams (2.5 moles) of orthochloronitrobenzene were added 120 grams (3.0) moles) of granular sodium hydroxide. The temperature of the reaction mixture was maintained at 65° C. during the addition of the sodium hydroxide (which required about 30 minutes). The reaction mixture was then stirred for an additional 16 hours and worked-up as described for POLYAMINE-A. Reduction of the material as described for POLYAMINE-A produced a dark liquid having a viscosity of 780 mPa.s at 25° C. and an amine number of about 50, which corresponded to 98% conversion to the diamine.

POLYAMINE-E: To a stirred solution of 1000 grams (1.0 mole) of POLYOL-E and 347 grams (2.2 moles) of orthochloronitrobenzene were added 100 grams (2.5) moles) of granular sodium hydroxide. The temperature of the reaction mixture was maintained at 65° C. during the addition of the sodium hydroxide (which required about 120 minutes). The reaction mixture was then stirred for an additional 12 hours and worked-up as described for POLYAMINE-A. Reduction of the material as described for POLYAMINE-A produced a dark liquid having a viscosity of 580 mPa.s at 25° C. and an amine number of about 84, which corresponded to 88% conversion to the diamine.

POLYAMINE-F: To a stirred solution of 1500 grams (1.0 mole) of POLYOL-F and 520 grams (3.3 moles) of ortho-chloronitrobenzene were added 150 grams (3.75 moles) of granular sodium hydroxide. The temperature of the reaction mixture was maintained at 65° C. during the addition of the sodium hydroxide (which required about 120 minutes). The reaction mixture was then stirred for an additional 16 hours and worked-up as described for POLYAMINE-A. Reduction of the material as described for POLYAMINE-A produced a dark liquid having a viscosity of 1360 mPa.s at 25° C. and an amine number of about 88, which corresponded to 92% conversion to the triamine.

POLYAMINE-G: To a stirred solution of 482 grams (1.6 moles) of POLYOL-H, 660 grams (4.2 moles) of ortho-chloronitrobenzene and 1000 ml of dimethylsulfoxide were added 225 grams (5.6 moles) of granular sodium hydroxide. The temperature of the reaction mixture was maintained at 60° to 65° C. during the addition of the sodium hydroxide (which required about 120 minutes). The reaction mixture was then stirred for an additional 5 hours at 65° C. To the reaction mixture were added 1500 ml distilled water and enough concentrated hydrochloric acid to make the mixture acidic. The layers were separated and the organic layer was again washed with distilled water (4 times with 1200 ml). After the last washing, the residual water and ortho-chloronitrobenzene were removed by vacuum distillation at 120° C. and 1 mm Hg pressure. The reaction mixture was then filtered to afford a dark, clear liquid having a viscosity at 25° C. of 2520 mPa.s. Reduction of the material as described for POLYAMINE-A produced a dark liquid having a viscosity of 2150 mPa.s at 25° C. and an amine number of about 222, which corresponded to 96% conversion to the diamine.

POLYAMINE-H: To a 3-neck flask equipped with a mechanical stirrer, thermometer, condenser and purged with dry nitrogen, were added 250 grams of POLYOL-G, 80 grams of isatoic anhydride and 2.0 grams of potassium hydroxide. The reaction mixture was heated to 90° C. and held for 20 hours at that temperature. To the reaction mixture was then added a mixture of 30 grams of distilled water and 3.6 grams of concentrated hydrochloric acid. After mixing, 200 ml of toluene were added and then a toluene/water azeotrope was removed by atmospheric distillation. The reaction mixture was then held at 110° C. and 1 mm Hg pressure to remove the last traces of toluene and water. The product was then filtered to afford 298 grams of a light brown, clear liquid having a viscosity of 1950 mPa.s at 25° C. The amine number of the product was 83 which corresponded to a 91% conversion to the diamine.

POLYAMINE-I: To a stirred solution of 1500 grams (0.75 mole) of POLYOL-I and 246 grams (1.5 moles) of isatoic anhydride were added 4 grams (0.1 mole) of sodium hydroxide. The reaction mixture was heated to 90° C. and held at that temperature for 72 hours. The reaction mixture was then worked-up as described for POLYAMINE-H to yield a dark clear liquid having a viscosity at 25° C. of 5350 mPa.s and an amine number of about 43 which corresponded to a 86% conversion to the diamine.

METHYL-MDI: a mixture of isomers containing about 60% by weight 3,4'-diisocyanato-2-,-4-, or -6-methyl-diphenylmethane, about 30% by weight 3,2'-diisocyanato-2-,-4-, or -6-methyldiphenylmethane, and 10% by weight of analytically unidentified methyl substituted diisocyanato diphenylmethane isomers. The NCO content is about 32% by weight.

EXAMPLES

EXAMPLE 1

22.5 grams of POLYAMINE-D were added with stirring over a 10 minute period to 77.5 grams of METHYL-MDI while holding the temperature at 50° C. The temperature was held at 50° C. for an additional 10 minutes and then cooled over a five minute period to 25° C. The clear urea prepolymer had an NCO content of about 24% and a viscosity at 25° C. of 196 mPa.s.

EXAMPLE 2

22.5 grams of POLYAMINE-D were added with stirring over a 10 minute period to 77.5 grams of METHYL-MDI while holding the temperature at 50° C. The temperature was then raised over a 20 minute period to 120° C. and held at that temperature for 40 minutes, followed by quench cooling to 25° C. The clear biuret prepolymer had an NCO content of about 23% by weight and a viscosity at 25° C. of 304 mPa.s.

EXAMPLES 3 THROUGH 18

Examples 3 through 10 used the process of Example 1, while Examples 11 through 18 used the process of Example 2. The materials used and the results obtained were as set forth in the folloiwng table:

TABLE

| Ex. | AMINE USED | AMINE PBW | ISO PBW | NCO CONTENT % BY WT. | VISCOSITY AT 25° C. mPa.s |
|---|---|---|---|---|---|
| 3  | A | 43.1 | 56.9  | 16.2 | 2060 |
| 4  | B | 43.1 | 56.9  | 16.5 | 1100 |
| 5  | F | 23.1 | 76.9  | 22.2 | 580  |
| 6  | E | 23.1 | 76.9  | 22.3 | 350  |
| 7  | C | 26.3 | 73.7  | 21.8 | 440  |
| 8  | H | 21.9 | 78.1  | 22.9 | 380  |
| 9  | I | 23.1 | 76.9  | 23.2 | 600  |
| 10 | G | 15.0 | 85.0  | 23.4 | 748  |
| 11 | A | 43.1 | 56.9  | 14.9 | 5200 |
| 12 | B | 43.1 | 56.9  | 15.7 | 1900 |
| 13 | F | 23.1 | 76.9  | 20.7 | 2010 |
| 14 | E | 23.1 | 76.9  | 21.0 | 970  |
| 15 | C | 26.3 | 73.7  | 21.1 | 775  |
| 16 | H | 21.9 | 78.1  | 22.0 | 740  |
| 17 | I | 23.1 | 76.9  | 22.3 | 900  |
| 18 | G | 15.0 | 85.0  | 21.3 | 7860 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A liquid, storage-stable isocyanate prepolymer having an isocyanate group content of from 3 to 30% by weight, prepared by reacting
(i) a diisocyanate corresponding to the formula

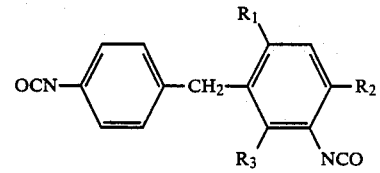

which may be present in admixture with 0 to 40% by weight, based on the total mixture, of diisocyanates corresponding to the formula

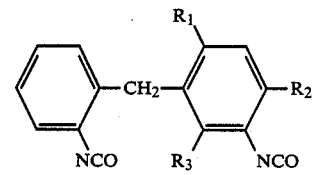

and optionally with 0 to 30% by weight, based on the total mixture, of other diisocyanatodiphenylmethane isomers which may be substituted; wherein two of the radicals $R_1$, $R_2$ and $R_3$ represent hydrogen and one of the radicals $R_1$, $R_2$ and $R_3$ represents a methyl group; with
(ii) a polyamine of the structure

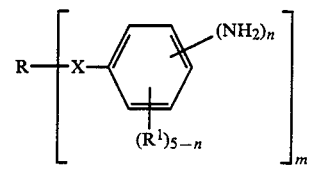

where R represents an m-valent residue obtained by the removal of m-functional groups from a compound having m-functional groups and having a molecular weight of from 76 to about 10,000,
X represents —O—,

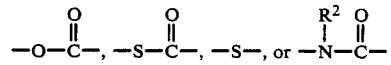

$R^1$ represents hydrogen or an inert substituent,
$R^2$ represents hydrogen, a $C_1$ to $C_5$ alkyl group or a phenyl group,
n is 1 or 2, and
m is an integer of from 2 to 8.
2. The prepolymer of claim 1 having an isocyanate group content of from 14 to 25% by weight.
3. The prepolymer of claim 1 wherein $R^1$ represents hydrogen, m is 2 and X is —O—.